UNITED STATES PATENT OFFICE.

CLAUDE A. O. ROSELL, OF NEW YORK, N. Y., ASSIGNOR TO THE AMERICAN LITHOGRAPHIC COMPANY, OF NEW YORK.

PRINTING-SURFACE.

SPECIFICATION forming part of Reissued Letters Patent No. 11,817, dated April 10, 1900.

Original No. 637,552, dated November 21, 1899. Application for reissue filed December 22, 1899. Serial No. 741,343.

*To all whom it may concern:*

Be it known that I, CLAUDE A. O. ROSELL, a citizen of the United States, residing in the city, county, and State of New York, have invented certain new and useful Improvements in Printing-Surfaces, of which the following is a specification.

The invention relates to planographic printing, and has especial reference to the character or construction of the printing form or device to be used in such planographic printing; and it consists of the improved printing form or device herein shown and claimed.

The invention has especial applicability and usefulness in connection with rounded or cylindrical printing-forms, and will be more especially described in that connection. More particularly it has in view the repeated preparation of a given planographic-printing form or device with a new fresh printing-surface each time and without undulation or unevenness, and this repeated production of fresh printing-surfaces, while accurately maintaining the special form and size and diameter, &c., of the printing-form after each operation of imparting transfers, printing, and removing the transfers in making the printing-form ready for a new printing operation.

In planographic cylinder-printing two methods have been used or suggested. In one a thin flexible sheet of aluminium or zinc is bent around a cylinder and is fastened there in place by suitable mechanical means, and the printing is effected from such sheet so cylindrically held and supported. In the other zinc is electrolytically deposited upon a cylinder of copper, and the printing is effected from the zinc surface thus deposited. In the former case the mechanical incidents and difficulties accompanying the application and holding of the flexible sheets, as well as the expense incidental to preparing the face of those sheets for printing purposes, as by sand-blasting, have constituted obstacles of moment. In the latter case after an edition has been printed the effort has been made to remove the zinc printing-surface by means of nitric acid; but the nitric acid in this operation has the disadvantage of removing also a notable amount of copper, thereby gradually diminishing the diameter of the copper cylinder and also dissolving the copper away unevenly, whereby the surface soon becomes uneven, a feature which interferes with and prevents the uniform taking of ink and water from the ink and water rollers, respectively, and the uniform printing of the same. Moreover, any notable diminution in the diameter of the printing-cylinder would interfere with and prevent the proper coöperation of that cylinder with the other parts of the printing-press, and register would be gradually interfered with and finally rendered impossible to attain without the reconstruction of the entire press. These difficulties are overcome in the following manner:

In the preferred form of my invention I prepare a copper cylinder, which may be a hollow shell adapted to be seated upon an interior and supporting mandrel or device and to be removed therefrom and adjusted thereupon when necessary, or it may be a solid copper cylinder. It is finished on its outer surface with great accuracy and care with respect to uniformity of surface, exactness of dimensions, &c., all with reference to the exact shape and size of printing-form desired for the press. I then electrolytically plate this copper cylinder with platinum or gold, imparting a sufficient thickness of coating to protect the underlying copper from the nitric acid or caustic soda or other acid or alkaline reagent to be subsequently used, as hereinafter explained. A thickness of from one to three ounces to the square foot will be sufficient for this purpose. To increase the resisting power of this protective coating, it should preferably be burnished. Upon this protective coating a zinc printing-surface is electrolytically deposited in such way as, while causing such zinc surface to be an integral part of the composite form, shall at the same time render it sufficiently porous and of the necessary surface character to adapt it to act as a lithographic or planographic printing surface. After the use of the surface for printing purposes and the removal of the ink of the transfer in the usual way, as with turpentine, &c., the entire zinc coating is removed by means of strong nitric acid or other suitable acid or alkaline reagent, such as caustic soda or hydrochloric acid or sulfuric acid. The platinum or gold protective surface will be exposed by this removal, but without being in any way affected or modified or itself removed, and will immediately be ready to receive a second deposit of zinc for a second printing operation or edition. Thus the printing form or surface consists of an outer coating or face of electrolytically-deposited zinc and suitable for planographic printing, but adapted to be wholly removed by a suitable acid or alkaline reagent after the printing is finished, and a base of suitable material integral with the outer printing coating or surface, the base having a protective coating or face underlying the printing-surface and of metal resisting the action of the reagent employed in removing the printing-surface. In this way and by the application of an even printing-surface of uniform and predetermined thickness the resulting printing form or device is as a whole always and permanently of the same exact shape and size, fitting it to coöperate permanently with the other parts of the printing-press. Moreover, as all the wear of the printing operation is on the outer coating or face, which is wholly removed and a new fresh surface applied for each new printing job, a printing-cylinder prepared as above described is practically indestructible, so that its permanence more than counterbalances its initial cost.

Although specifically described with reference to cylinder-printing, where the invention has peculiar usefulness and advantages, and especially in connection with multicolor cylinder-printing, it nevertheless applies equally well to printing from flat or curved surfaces of any shape.

What I claim as new, and desire to secure by Letters Patent, is—

1. A lithographic-printing form composed of a metallic base, a protective coating thereon of a different metal, the base with said protective coating being as a whole, of non-varying shape and dimensions, thus permanently adapting the printing-form as a whole to the coöperating parts of the press, and of an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

2. A lithographic-printing form composed of a metallic base, a burnished protective coating thereon of a different metal, the base with said protective coating being as a whole of non-varying shape and dimensions, thus permanently adapting the printing-form as a whole to the coöperating parts of the press, and of an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

3. A lithographic-printing form composed of a metallic base, a protective coating thereon of a different metal, and resisting the action of nitric acid, the base with said protective coating being as a whole, of non-varying shape and dimensions, thus permanently adapting the printing-form as a whole to the coöperating parts of the press, and of an outer planographic-printing surface of electrolytically-deposited zinc, said surface having a design upon it suitably developed, and being thereby adapted to print lithographically, the said surface being also adapted to be thereafter wholly removed by strong nitric acid, the base, the protective coating and the printing-surface being all integrally united together substantially as described.

4. A cylindrical lithographic-printing form composed of a metallic base, a protective coating thereon of a different metal, the base with said protective coating being as a whole of non-varying shape and dimensions, thus permanently adapting the printing-form as a whole to the coöperating parts of the press, and of an outer planographic-printing surface of electrolytically-deposited zinc, said surface having a design upon it suitably developed, and being thereby adapted to print lithographically, the said surface being also adapted to be thereafter wholly removed by a suitable acid or alkaline reagent not acting on the protective coating, the base, the protective coating and the printing-surface being all integrally united together substantially as described.

5. A cylindrical lithographic-printing form composed of a metallic base, a burnished protective coating thereon of a different metal, the base with said protective coating being as a whole of non-varying shape and dimensions, thus permanently adapting the printing-form as a whole to the coöperating parts of the press, and of an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

6. A lithographic-printing form composed of a metallic base, a protective coating thereon of platinum, the base with said protective coating being as a whole of non-varying shape and dimensions, thus permanently adapting the printing-form as a whole to the coöperating parts of the press, and of an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

7. A lithographic-printing form composed of a metallic base of copper, a protective coating thereon of a different metal, the base with said protective coating being as a whole of non-varying shape and dimensions, thus permanently adapting the printing-form as a whole to the coöperating parts of the press, and of an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

8. A lithographic-printing form composed of a metallic base of copper, a protective coating thereon of platinum, the base with said protective coating being as a whole of non-varying shape and dimensions, thus permanently adapting the printing-form as a whole to the coöperating parts of the press, and of an outer planographic-printing surface of electrolytically-deposited zinc, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

9. A lithographic-printing form composed of a metallic base, a protective coating thereon of a different metal, the base with said protective coating being as a whole, of non-varying shape and dimensions, thus permanently adapting the printing-form as a whole to the coöperating parts of the press, and of an outer planographic-printing surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

10. A lithographic-printing form composed of a metallic base, a protective coating thereon of a different metal, the base with said protective coating being as a whole, of non-varying shape and dimensions, thus permanently adapting the printing-form as a whole to the coöperating parts of the press, and of an outer planographic-printing surface of electrolytically-deposited metal, said surface having a design upon it suitably developed, and being thereby adapted to print lithographically, the said surface being also adapted to be thereafter wholly removed by a suitable reagent not acting on the protective coating, the base, the protective coating and the printing-surface being all integrally united together substantially as described.

11. A lithographic-printing form comprising a protective face of non-etchable metal of non-varying shape and an outer planographic-printing surface, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

12. A lithographic-printing form comprising a protective face of non-etchable metal of non-varying shape and an outer planographic-printing surface of electrolytically-deposited metal, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

13. A lithographic-printing form comprising a protective face of non-etchable metal of non-varying shape and an outer planographic-printing surface of electrolytically-deposited zinc, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

14. A lithographic-printing form comprising a platinum protective face of non-varying shape and an outer planographic-printing surface, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

15. A lithographic-printing form comprising a platinum protective face of non-varying shape and an outer planographic-printing surface of electrolytically-deposited metal, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

16. A lithographic-printing form comprising a platinum protective face of non-varying shape and an outer planographic-printing surface of electrolytically-deposited zinc, said surface having a design upon it suitably developed and being thereby adapted to print lithographically, said surface being also adapted to be thereafter wholly removed by a suitable reagent not acting on the protective face, the protective face and the printing-surface being integrally united together, substantially as described.

In testimony whereof I have signed my name to this specification in the presence of two subscribing witnesses.

CLAUDE A. O. ROSELL.

Witnesses:
EDWIN SEGER,
SIDNEY MANN.